United States Patent Office 2,805,382
Patented Sept. 3, 1957

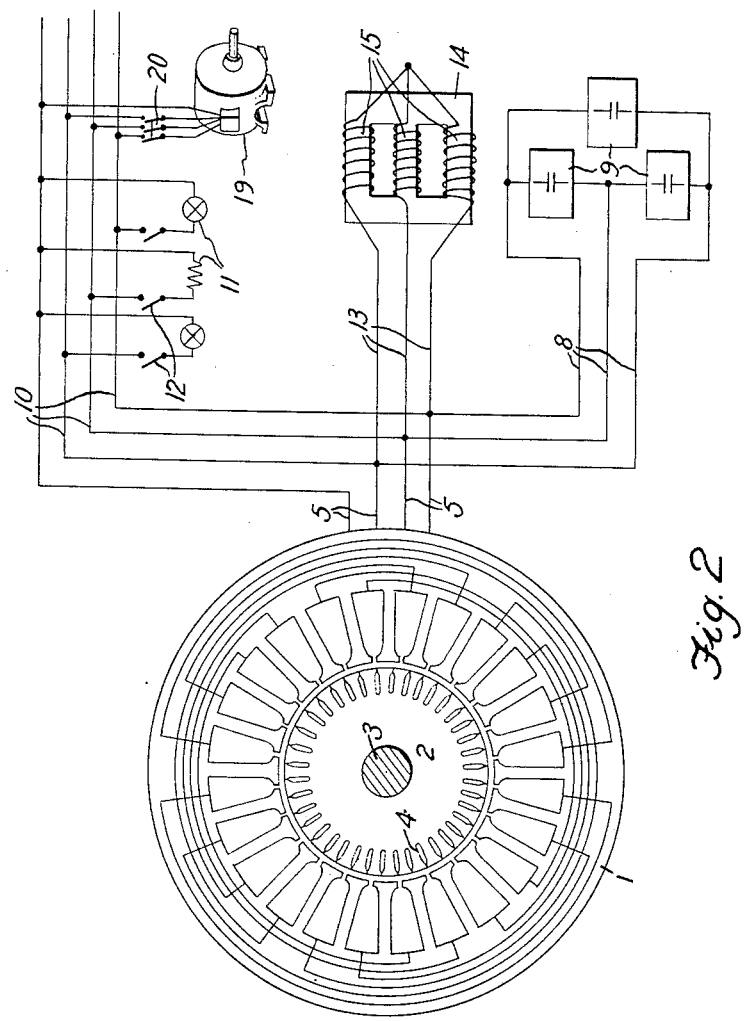

2,805,382

ELECTRIC GENERATING SET FOR ALTERNATING CURRENT

Isaac Goodbar and Libero Capo, Buenos Aires, Argentina

Application May 29, 1952, Serial No. 290,778

2 Claims. (Cl. 322—47)

The present invention consists of a novel power plant adapted to generate electric energy and is especially advantageous for cases where small amounts of power (in the order of 1 or a few kilowatts) are needed in alternating current.

The generating set which is the object of the present invention lacks any moving coil, intermittent contacts of any type, slip rings or any moving parts, with the exception of the solid rotor (squirrel-cage) and, of course, the prime mover.

This generating set can work entirely independent from any other sources of power without requiring attention, as its voltage and frequency in the disposition object of the present invention are maintained automatically within pre-established limits (variations do not exceed a small value above or below rated) notwithstanding changes in power consumption from no-load to full load.

The power plant in accordance with the present invention does not require fuses or protective devices of any type for the reasons that will duly be made apparent during the course of the present description.

It is also very easy to operate these generating sets in parallel with each other or with the public supply systems, without requiring any type of synchronizing device or special protection.

The fact that electric motors of the induction type with squirrel-cage rotors can be used as generators of alternating current, if they are forced to rotate at a speed higher than the synchronic speed corresponding to the network to which they are connected, has been known for many years. The use of asynchronic generators built in accordance with this principle, in parallel with networks, fed from alternators, is also known. However, notwithstanding the notable simplicity of the system, up to the present time no power plants based on this principle have been built which could work independently. In cases of large power plants, independent asynchronic generators do not offer important advantages over conventional alternators. In fact, as these generators only provide a current advanced in phase with reference to the voltage and the majority of consuming apparatus require a current in phase or delayed with respect to the voltage, it is necessary to add devices to take the current advanced with reference to the voltage. Up to the present, the only devices known for this purpose are static condensers and alternators or synchronic motors over-excited. The combination of the asynchronic generator with any of these devices is no more economical than a convention alternator.

In cases of small power requirements, of the order of a few kilowatts, a combination of an asynchronic generator with the condensers costs less and is more reliable than a conventional alternator with its corresponding exciter, but, in these cases, it is necessary to have an automatic regulation of voltage, as a plant of this size must work alone, without any specially trained staff in charge of it. For these reasons, up to the present, asynchronic generators could not be used independently.

It is interesting to note that even in such recently published papers as "Squirrel-cage Induction Generator for Power Generation" published in "Electrical Engineering," of New York, in September 1951, the possibility of using asynchronic generators in independent plants is entirely ignored.

The generating set in accordance with the present invention works very well independently, keeping voltage and frequency automatically within pre-established limits notwithstanding the fact that the set does not include any moving device whatsoever, with the exception of the prime mover and the solid squirrel-cage rotor.

In order that this invention may be clearly understood and readily put into practice, two principal embodiments have been shown in the accompanying drawings, in which:

Figure 2 represents, in a similar way, a three-phase generating set.

Figure 1:
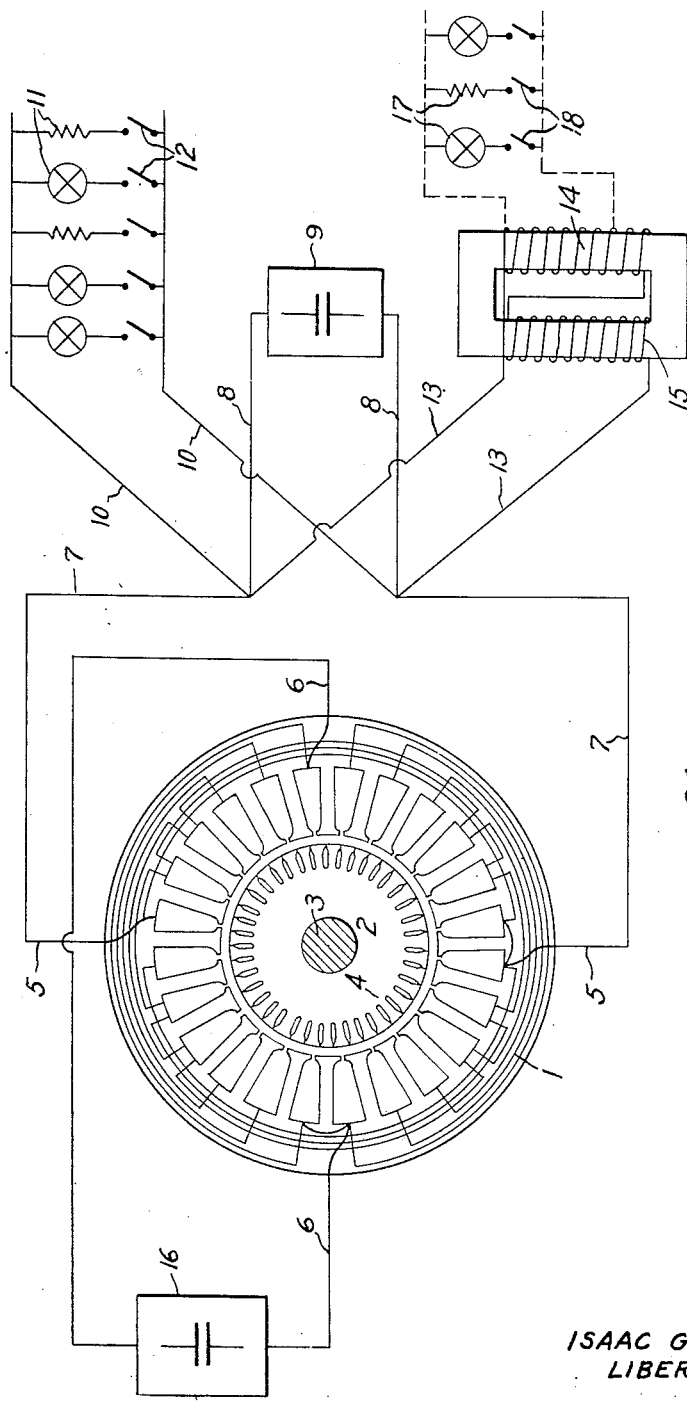
Figure 1 is a diagrammatic sectional view of a single phase generating set, showing its electrical connections.

In the embodiments shown in Figure 1, a diagrammatic cross section of the asynchronous generator, built as a two phase, two pole, induction motor, is shown. This generator comprises a cylindrical stator of laminated ferromagnetic material 1, provided with slots, where coils 5 and 6, which will be called main and auxiliary, are placed. These coils are so placed as to generate a rotating magnetic field if they were connected to two sources of alternating voltage ninety degrees out of phase with each other.

Inside this stator is placed the rotor 2, also of laminated ferromagnetic material, and which carries slots where short-circuit bars 4 of copper, aluminium or other conducting, non-magnetic material, forming a squirrel-cage, are placed. This rotor 2 is fixed to shaft 3, which allows its free rotation when any prime mover, not shown in the figure, impels it.

Main coil 5 is branched by means of leads 7 and 8, to the electrostatic condenser 9, of an appropriate capacity; by means of leads 7 and 13, to coil 15, consisting of a certain number of turns wound around a core 14 of laminated ferromagnetic saturable material; and, finally, by means of leads 7 and 10 to the useful load which may consist of incandescent or fluorescent lamps, electric motors, resistors or, in general any device consuming electric power, sometimes referred to herein as an electric load.

Auxiliary coil 6 is permanently connected to condenser 16, of a suitable capacity.

The above mentioned coil 15 and its core 14 are so dimensioned, that the ferromagnetic material reaches magnetic saturation when the voltage applied to coil 15 reaches the rated voltage of the set. In this way, small changes of voltage, around rated voltage will cause large changes of current in coil 15.

It has been stated that the coil 15 consists of a certain number of turns and that the coil and its core 14 are so dimensioned that the ferromagnetic material reaches magnetic saturation when the voltage applied to coil 15 reaches the rated voltage of the set. Given these requirement, there are a number of formulas known to those skilled in the art that can be applied to determine the number of turns and dimensions of these parts and that are substantial equivalents of each other. One of the simpler formulate, that for pratical purposes may be considered typical of such known formulate, is:

$$N = (2.252)(10)^7 E/fBS$$

where E and $f$ in volts and cycle per second, are the rated voltage and frequency of the source, i. e. the stator coil, connected to the terminals of coil 15, S is the net cross section, in square centimeters, of the ferromagnetic core 14, and B is a value of magnetic flux density, in gauss, at which the ferromagnetic material of the core 14 saturates.

Everything being as above described and assuming that, initially, all interrupting switches 12 are open, the equipment operates as will be described.

When the rotor 2, impelled by the prime mover, turns around its axis, small alternating currents are induced in the rotor bars 4, because of magnetic remanence, of such a frequency that they generate a weak magnetic field rotating at a speed slightly below rotor speed. This magnetic field induces electric voltages in coils 5 and 6, having instantaneous values always proportional to the first derivative, with respect to time of the magnetic flux linked by them, and having an opposite sign (a current proportional to this voltage will generate a flux opposing changes in the flux linked by the coils). As these voltages are applied to condensers 9 and 16, displacement currents of instantaneous values always proportional to the first derivative, with respect to time, of the applied voltages, will circulate. In other words, the currents circulating through condensers 9 and 16 are, at any instant, proportional to the second derivative, with respect to time, of the magnetic flux linked by coils 5 and 6.

As the magnetic fluxes linked by coils 5 and 6 are sensibly sinusoidal if they are represented against time, their second derivative, with sign changed, is practically proportional to the original function. This means that the current circulating through coils 5 and 6, due to the presence of condensers 9 and 16, is such that it generates a magnetic flux proportional, and having a direction identical to the one of the original weak flux linked by the same coils and due to the original small currents induced by remanence.

Because of this, the magnetic flux builds up rapidly, which produces further increases in voltage and current etc.

As voltages start to build up, current starts to circulate through coil 15. As the voltage between its terminals is sensibly sinusoidal, this current practically opposes the current through the condenser 9, as this is ninety degrees ahead of the voltage (practically) while the former is approximately ninety degrees behind the same voltage. In other words, if the current in 9 is a magnetizing current (i. e. the magnetic flux increases with it) the current in 15 is demagnetizing.

The increases in magnetic flux and voltage, successively, in a cumulative way, continue until the demagnetizing current in 15 increases to such a value as to prevent any further increase in voltage, which happens at a value slightly above rated, when core 14 saturates magnetically.

When the loads 11 are branched on, by means of switches 12, the current through them (output current) will also pass through coil 5. If the load consists of ohmic resistances, reactors, or a combination of both, this output current will have a demagnetizing component, which will produce a decrease in terminal voltage. A small decrease of the voltage, however, will cause a large decrease of the demagnetizing current 15, which will instantly stabilize terminal voltage at a value slightly below the one previously obtained. If the load consisted of capacitors, the output current would have a magnetizing component (or will be entirely magnetizing). Large increases in output voltage would be prevented, however, by large increases of the demagnetizing current 15; voltages would be stabilized at values slightly above initial.

In the single-phase set shown in Figure 1, the condenser 16 and auxiliary coil 6 further stabilize the output voltage, as the output current does not flow through them. This coil 6 and condenser 16 are so dimensioned that at no load its voltage is lower than the output voltage, while at full load, it is higher. In this way, at no load the current through coil 6 will be demagnetizing, while at full load it will be magnetizing.

When a short-circuit takes place anywhere in the system, condenser 9 or 16 are immediately short-circuited and, therefore, a large part of the magnetizing current disappears immediately causing all voltages to disappear; the generator continues to rotate at no load. As soon as the short-circuit is eliminated, the system becomes excited again and voltages are reestablished. An excessive overload will produce the same effect, because of its demagnetizing component. Because of this the system does not require fuses or any protective devices whatsoever.

The coil 15, with its core 14, can act also as a transformer or autotransformer, if, for any reason, power is desired at voltages different to those originally generated. In Figure 1, loads 17 are operated at a voltage lower than the one generated originally by the set.

Figure 2 represents a three-phase generating set. This is similar to the one already described. The condensers 9 in general will be connected so as to operate them at the highest possible voltage (for economic reasons), the three-phase saturated core reactor 15—14 will be, preferably, Y connected, so as to eliminate third (and multiples of the third) harmonics, from the output voltage. Loads 11 and 20 can be connected in any convenient form to leads 10 and 5.

It has been stated that this three phase set is similar to the single-phase set already described, and in connection with which reference has been made to the requirements as regards the saturated core reactor 15—14 and one mode or formula for calculating the dimensions for satisfying such requirements. The corresponding typical formula for the number of turns in the three phase embodiment is $$N = (1.30)(10)^7 E/fBS$$

where E and $f$, in volts and cycles per second, are the rated voltage and frequency between the stator coil terminals connected to the auxiliary coil terminals, S is the net cross section, in square centimeters, of one of the parallel branches of the separate closed ferromagnetic core and B is a value of magnetic flux density, in gauss, at which the ferromagnetic material of which the separate closed core is made, saturates magnetically.

Obviously a number of constructional and detail modifications may be made without departing from the nature and scope of the present invention, as defined in the appended claims.

Though only single and three-phase systems have been shown in the figures, it is obvious that systems with any number of phases connected in any suitable way, can be built; also, in the system shown in Figure 1, the auxiliary coil 6 and condenser 16 could be eliminated (with a corresponding decrease in efficiency), or, if so desired, another compensating coil could be placed in parallel with condenser 16.

It will be evident that the generating set in accordance with the present invention, being of light weight and not requiring protective devices, is particularly adapted for use in aircraft, although the uses of same are manifold and will be obvious to experts in the art.

Also, it is evident that the asynchronous generator could be constructed in any known form used to construct an induction motor, for instance, with an axial air gap, or, as explained in U. S. Patent application No. 257,498/1948.

Having now particularly ascertained and described the nature of the present invention and the manner in which the same is to be performed, what we claim is:

1. A generator set for alternating current comprising an asynchronous generator with a squirrel cage rotor and a coiled stator having at least one group of windings, at least one condenser means connected across the terminals of said group of windings, and reactor means connected across said terminals consisting solely of auxiliary alternating current coil means wound on a separate closed ferromagnetic core and constituting the sole magnetizing means therefor, said alternating current coil means saturating said core, when rated voltage is developed at said terminals, with alternating magnetic flux produced therein by the alternating current voltage developed at said terminals, said coiled stator comprising two groups of windings geometrically separated by an angle equal to one hundred eighty degrees divided by the number of poles, there being two of said condenser means connected respectively one to the terminals of each group of windings, and said reactor means being connected across the terminals of only one of said groups of windings, said last named terminals constituting the terminals of the generator set that are connected to an electrical load.

2. A generator set for alternating current comprising an asynchronous generator with a squirrel cage rotor and a coiled stator having at least one group of windings, at least one condenser means connected across the terminals of said group of windings, and reactor means connected across said terminals consisting solely of auxiliary alternating current coil means wound on a separate closed ferromagnetic core and constituting the sole magnetizing means therefor, said alternating current coil means saturating said core, when rated voltage is developed at said terminals, with alternating magnetic flux produced therein by the alternating current voltage developed at said terminals, said coiled stator comprising a plurality of groups of windings geometrically separated by an angle equal to 360° divided by the number of groups and by the number of poles, there being a number of said condenser means equal to the number of groups of windings and connected respectively one to the terminals of each group of windings, and said reactor means being connected across the terminals of only one of said groups of windings, said last named terminals constituting the terminals of the generator set that are connected to an electrical load.

References Cited in the file of this patent

FOREIGN PATENTS

| | | |
|---|---|---|
| 479,260 | Great Britain | Feb. 2, 1938 |
| 130,905 | Australia | Jan. 12, 1949 |